United States Patent
Kidokoro et al.

(10) Patent No.: US 6,192,306 B1
(45) Date of Patent: Feb. 20, 2001

(54) SPEED CHANGE CONTROLLER FOR CONTINUOUSLY VARIABLE TRANSMISSION

(75) Inventors: Hitoshi Kidokoro, Yokohama; Itsuro Muramoto, Yokosuka, both of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 08/929,886

(22) Filed: Sep. 15, 1997

(30) Foreign Application Priority Data

Sep. 18, 1996 (JP) .................................................. 8-246465

(51) Int. Cl.$^7$ .................................................. B60K 41/18
(52) U.S. Cl. .............................. 701/51; 701/61; 475/186; 475/192
(58) Field of Search .................................. 701/51, 56, 61; 475/186, 192; 180/337, 338, 339

(56) References Cited

U.S. PATENT DOCUMENTS 4,718,012 * 1/1988 Oshiage ............................ 364/242.1

OTHER PUBLICATIONS

M. Nakano et al., Dynamic Characteristics of Speed Ratio Control of the Halt Toroidal CVT for Passenger SAE Technical Paper Series, Sep. 1990, p. 24–32.

* cited by examiner

Primary Examiner—William A Cuchlinski, Jr.
Assistant Examiner—Arthur Donnelly
(74) Attorney, Agent, or Firm—Foley & Lardner

(57) ABSTRACT

In a continuously variable transmission for use with a vehicle comprising an actuator for continuously varying a speed change ratio, a target speed change ratio is set according to the vehicle running conditions and a real speed change ratio of the transmission is detected. A proportional value which is directly proportional to a difference between the target speed change ratio and real speed change ratio, and an integral value of the difference therebetween, are calculated. When the integral value is not within a preset range, the integral value is corrected to a value within the range, and the actuator is driven based on the sum total of the proportional value and the corrected integral value. In this way, a command exceeding the response capability of the actuator is prevented from being output to the actuator, and overshoot of the speed change ratio is prevented.

12 Claims, 14 Drawing Sheets

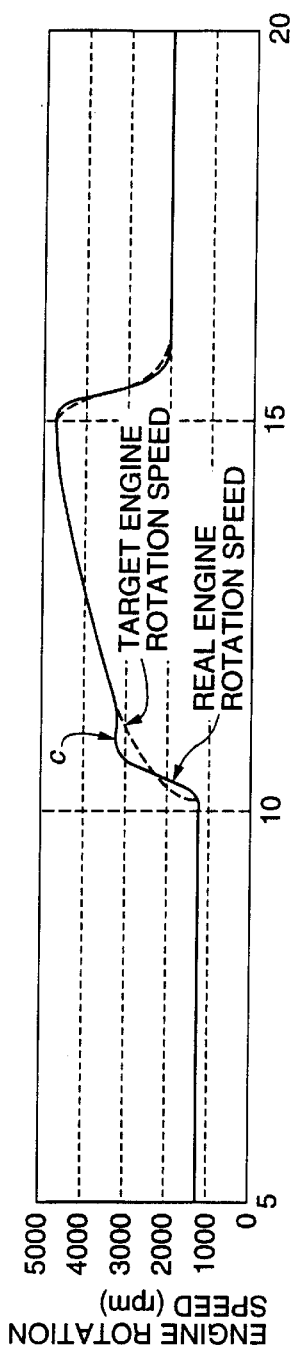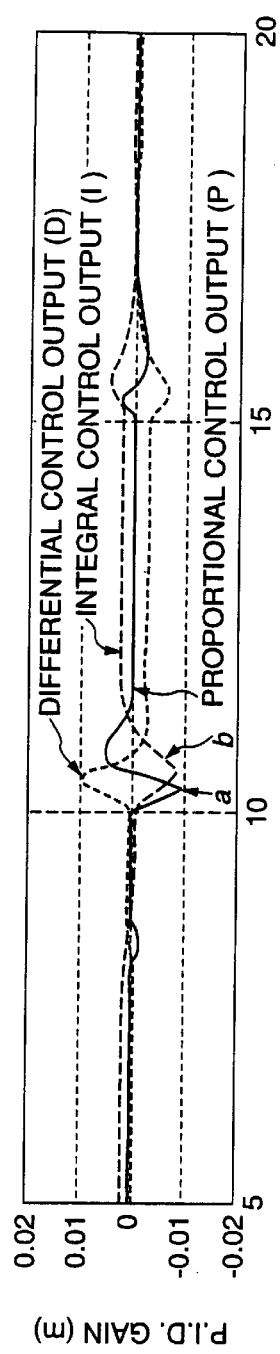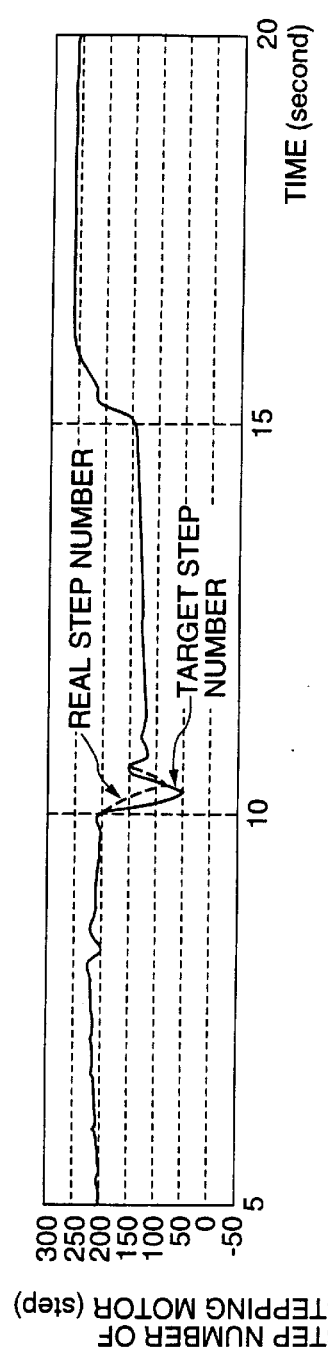
FIG. 13A PRIOR ART
FIG. 13B PRIOR ART
FIG. 13C PRIOR ART

SPEED CHANGE CONTROLLER FOR CONTINUOUSLY VARIABLE TRANSMISSION

The contents of Tokugan Hei 8-246465, with a filing date of Sep. 18, 1996 in Japan, are hereby incorporated by reference.

FIELD OF THE INVENTION

This invention relates to control of a continuously variable transmission.

BACKGROUND OF THE INVENTION

A toroidal type continuously variable transmission for use with a vehicle is disclosed, for example, in Tokkai Hei 3-89066 published by the Japanese Patent Office in 1991. In this controller, a pair of power rollers are gripped between input/output cone disks on the same rotation axis, and a speed change ratio is continuously varied according to a tilt of these power rollers.

The power rollers are supported by a trunnion, and their inclination is varied by displacing the trunnion in specified directions respectively at right angles to the rotation axes of the rollers and the disks. Such an assembly is disclosed for example in SAE Technical Paper No. 901761 published by the Engineering Society For Advancing Mobility in 1990.

Each trunnion is associated with an oil pressure piston, and hydraulic pressure is supplied to the oil pressure piston via a control valve comprising a spool and a sleeve linked to a stepping motor. The stepping motor rotates according to a speed change command value or a step number input from a controller comprising a microprocessor.

An offset amount from a neutral position of the trunnion in the aforesaid specified direction is mechanically fed back to the spool of the control valve via a cam or a link. Due to this feedback, the trunnion offset amount is controlled so as to obtain a power roller gyration angle depending on the command value.

As the offset of the trunnion is only of the order of several millimeters, when part of the trunnion deforms due to the transmitting torque of the power roller, an error arises between a target speed change ratio and a real speed change ratio.

One way of reducing this error would be to use an electronic feedback system wherein the real speed change ratio is measured using a sensor, and the controller controls the stepping motor such that the real speed change ratio coincides with the target speed change ratio.

In this electronic feedback system, it is desirable to perform PID (Proportional Integral Differential) control according to the characteristics of a speed change target value depending on engine running conditions.

In PID control, when a discrepancy arises between a target value and a measured value, a direct proportional output P is first generated, and then an integral control output I, which is an integral value, is generated.

In this case, when the variation of the discrepancy exceeds a stepping motor operating speed limit (response speed limit), a target step number given to the stepping motor and real step number accomplished by the stepping motor do not coincide, and as a result the discrepancy is not eliminated. Hence the direct proportional output P does not disappear, and an integral cumulative value of an integral control output value also increases.

At some point, when the real speed change ratio coincides with the target speed change ratio, the direct proportional control output P disappears, however the integral control output I still remains due to the drive speed lit of the step motor and it continues to accumulate. As a result, the real speed change ratio overshoots the target speed change ratio. In a vehicle transmission, this overshoot of the speed change ratio causes the drivability of the vehicle to be impaired.

SUMMARY OF THE INVENTION

It is therefore an object of the invention to suppress overshoot of a speed change ratio in speed change control of a continuously variable transmission comprising an electronic feedback system.

It is a further object of this invention to suppress overshoot of a speed change ratio even in case the characteristics of the continuously variable transmission have deteriorated with time.

In order to achieve the above objects, this invention provides a speed change controller for use with a continuously variable transmission of a vehicle, this transmission having an actuator for continuously varying a speed change ratio. The controller comprises a sensor for detecting a real speed change ratio of the transmission and a control circuit. The control circuit is configured to set a target speed change ratio of the transmission according to a running state of the vehicle, calculate a proportional value which is directly proportional to a difference between the target speed change ratio and the real speed change ratio, calculate an integral value which is the integral of the difference between the target speed change ratio and the real speed change ratio, correct the integral value to a value within a preset range when the integral value does not lie within the preset range, and drive the actuator based on the sum total of the proportional value and the integral value.

It is preferable that the control circuit is further configured to expand the preset range by a predetermined first minute amount when the integral value does not lie within the preset range.

It is further preferable that the control circuit is further configured to narrow the preset range by a predetermined second minute amount less than the first minute amount when the integral value lies within the preset range.

It is also preferable that the controller further comprises a device for detecting a running state of the transmission, wherein the control circuit is further configured to set the preset range according to the running state of the transmission.

In this case, it is further preferable that the detecting device comprises a sensor for detecting a temperature of lubricating oil of the transmission and a sensor for detecting a pressure thereof.

According to another aspect of this invention, the control circuit is configured to set a target speed change ratio of the transmission according to a running state of the vehicle, calculate a proportional value which is directly proportional to a difference between the target speed change ratio and the real speed change ratio, calculate an integral value which is the integral of the difference between the target speed change ratio and the real speed change ratio, calculate a command value to be output to the actuator based on the proportional value and the integral value, calculate a variation rate of the command value, stop calculating the integral value when the variation rate exceeds a predetermined variation rate, and drive the actuator by outputting the command value thereto.

It is preferable that the predetermined variation rate is set based on an operating speed limit of the actuator.

It is also preferable that the controller further comprises a device for detecting a running state of the transmission, wherein the control circuit is further configured to determine the predetermined variation rate according to the running state of the transmission.

It is further preferable that the detecting device comprises a sensor for detecting a temperature of lubricating oil of the transmission and a sensor for detecting a pressure thereof.

The details as well as other features and advantages of this invention are set forth in the remainder of the specification and are shown in the accompanying drawings.

BRIEF DESCRIPTION OF THE DRAWINGS

FIGS. 13A–13C are timing charts showing variations of engine rotation speed, control output and a step number of a step motor according to a prior art.

DESCRIPTION OF THE PREFERRED EMBODIMENTS

Figure 1:
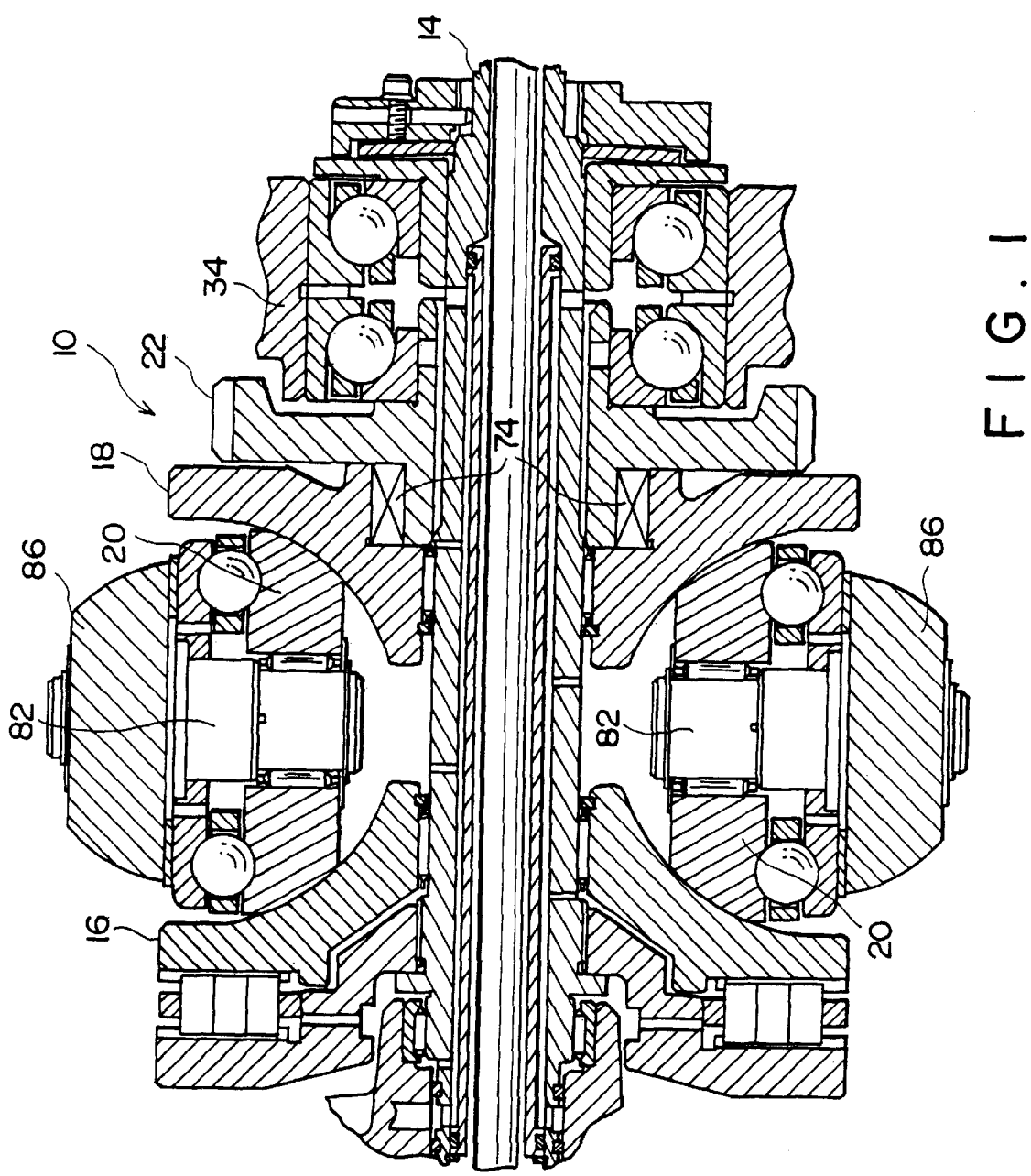
FIG. 1 is a vertical sectional view of a toroidal continuously variable transmission to which this invention is applied.

Referring to FIG. 1 of the drawings, an input cone disk 16 and a corresponding output cone disk 18 are installed on an Input shaft 14 of a single cavity toroidal type continuously variable transmission (CVT) 10 for a vehicle. A kinetic force transmitted to the input cone disk 16 from the input shaft 14 is transmitted to the output cone disk 18 via the rotation of a pair of power rollers 20, and is then transmitted to an output gear 22 connected to the output cone disk 18 by a spline 74.

The pair of power rollers 20 is gripped by the disks 16 and 18. Each of the power rollers 20 is supported on a trunnion 86 via an eccentric shaft 82, and is free to rotate on a rotation axis $O_1$ shown in FIG. 2.

The upper ends of each of the trunnions 20 are connected by an upper link 100A via a radial bearing 96. The lower ends are connected by a lower link 100B via a radial bearing 98.

The trunnion 86 is supported free to rotate about a gyration axis $O_3$ of the power roller 20 which intersects with the rotation axis $O_1$ of the power roller at right angles. The trunnion 86 is also connected to a piston 108A of a hydraulic cylinder 108, and displaces in the direction of a Y axis parallel to the gyration axis $O_3$ according to a pressure balance between oil chambers 108C, 108D. Oil pressure is supplied to the oil chambers 108C, 108D from an oil pump, not shown, via a control valve 120.

Figure 2:
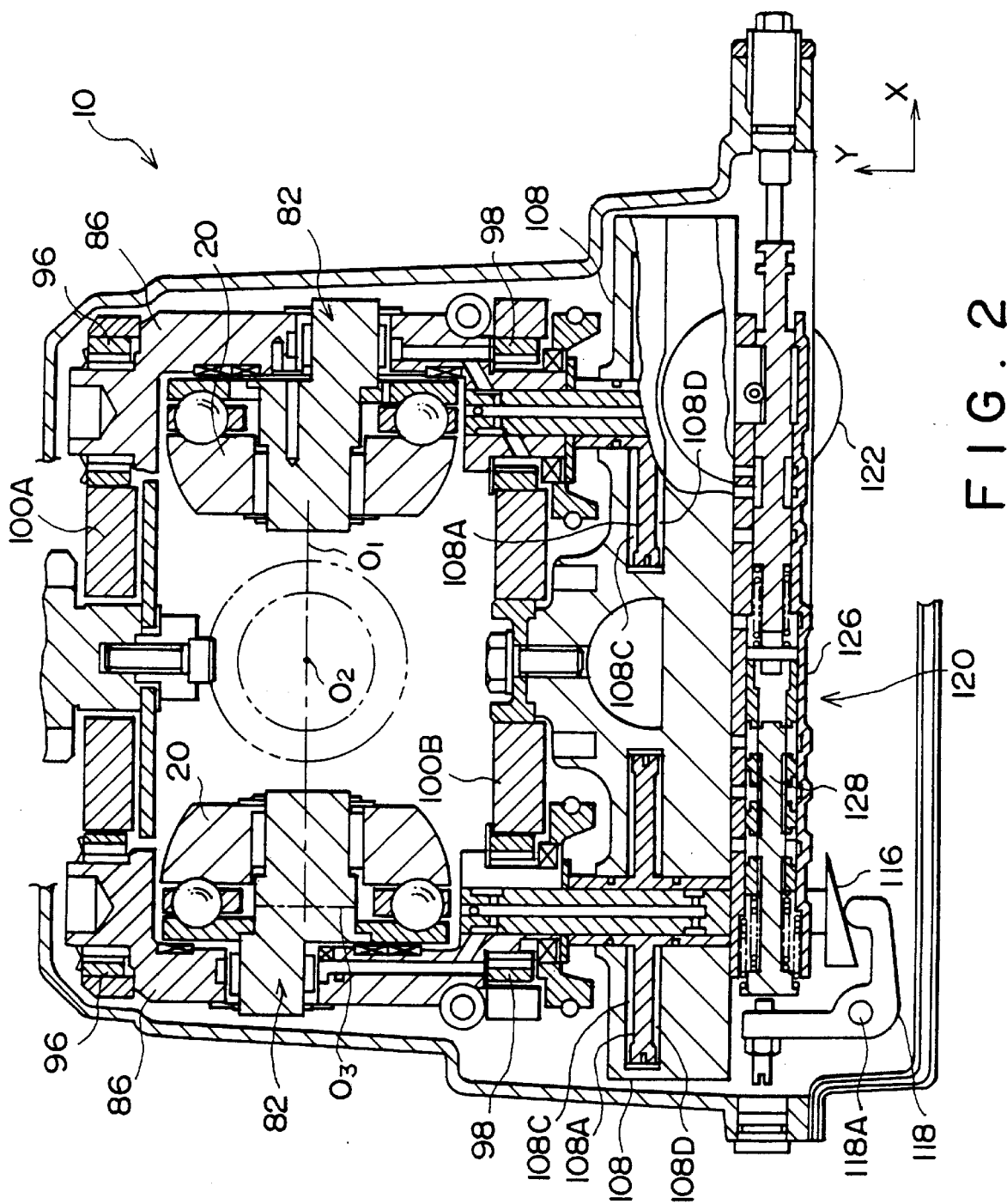
FIG. 2 is a horizontal sectional view of the toroidal continuously variable transmission.

An oil pressure circuit connecting the control valve 120 with the oil chambers supplies an equal oil pressure to the oil chamber 108C driving the piston 108A on the left-hand side of FIG. 2, and the oil chamber 108D driving the piston 108A on the right-hand side of FIG. 2. It also supplies an equal oil pressure to the oil chamber 108D driving the piston 108A on the left-hand side of FIG. 2, and the oil chamber 108C driving the piston 108A on the right-hand side of FIG. 2.

In this way, the two trunnions 86 which are facing each other are displaced in mutually opposite directions along the Y axis.

The control valve 120 comprises a sleeve 126 and a spool 128 which slides inside the sleeve, the oil pressure supplied to the assembly of the two oil chambers 108C, 108D from the hydraulic pressure source being varied according to the relative displacement of the sleeve 126 and spool 128. The sleeve 126 is connected to a stepping motor 122, and is displaced according to the rotation position of the stepping motor 122.

A control cam 116 is fixed to the lower end of the trunnion 86 situated on the left-hand side of the pair of trunnions 86 in FIG. 2. A predetermined tilt surface is formed on a lower surface of the control cam 116, and one end of a link 118 which is free to swing about a pivot 118A as center comes into contact with this tilt face. The other end of this link 118 comes in contact with the spool 128 of the control valve 120.

In this way, displacements of the control cam 116 in the direction of the Y axis and around the Y axis of the trunnion 86 on the left-hand side of FIG. 2, are fed back as positional displacements of the sleeve 128 of the speed change controller 120 via the link 118.

In the above arrangement, the trunnion 86, link 118, control cam 116 and sleeve 126 form a mechanical feedback mechanism.

Next, the action of this continuously variable transmission 10 will be described.

When the continuously variable transmission 10 is fixed at a predetermined speed change ratio, the relative positions of the sleeve 126 and spool 128 are also fixed, the forces exerted by the disks 16, 18 on the trunnion 86 and the oil pressure acting on the oil pressure piston 108A being in equilibrium with each other.

To change the speed change ratio of the continuously variable transmission 10, the step motor 122 is rotated, and the sleeve 126 is displaced. As the relative positional relationship of the sleeve 126 and spool 128 is thereby shifted from the fixed position, the oil pressure acting on the oil chambers 108C, 108D changes, and a propelling force driving the trunnion 86 in the direction of the Y axis is produced in the oil pressure piston 108A.

In FIG. 1, the trunnion 86 is in the neutral position, but when the trunnion 86 is displaced from the neutral position in the direction of the axis $O_3$ by a propelling force, a gyrational force is exerted on the power roller 20 from the input cone disk 16 and output cone disk 18, the power roller 20 suffers a rotational displacement about the gyration axis $O_3$ together with the trunnion 86, and a gyration angle changes.

When the gyration angle of the power roller 20 changes, the contact position of the power roller 20 with the input cone disk 16 and the contact position of the power roller 20 with the output cone disk 18 both change, and the speed change ratio of the continuously variable transmission 10 thereby changes.

On the other hand, the displacement in the Y axis direction of the trunnion 86 and the variation of gyration angle of the power roller 29 are fed back as an axial displacement of the spool 128. When the relative positions of the sleeve 126 and the spool 128 have returned to the original neutral state due to the displacements of the sleeve 126 and spool 128, the force exerted by the cone disks 16, 18 on the trunnion 86 is again in equilibrium with the oil pressure acting on the oil pressure piston 108. Subsequently, transmission of rotation from the input cone disk 16 to the output cone disk 18 takes place at a new speed change ratio.

The step motor 122 rotates according to a speed change command value output by the speed change controller.

Figure 3:
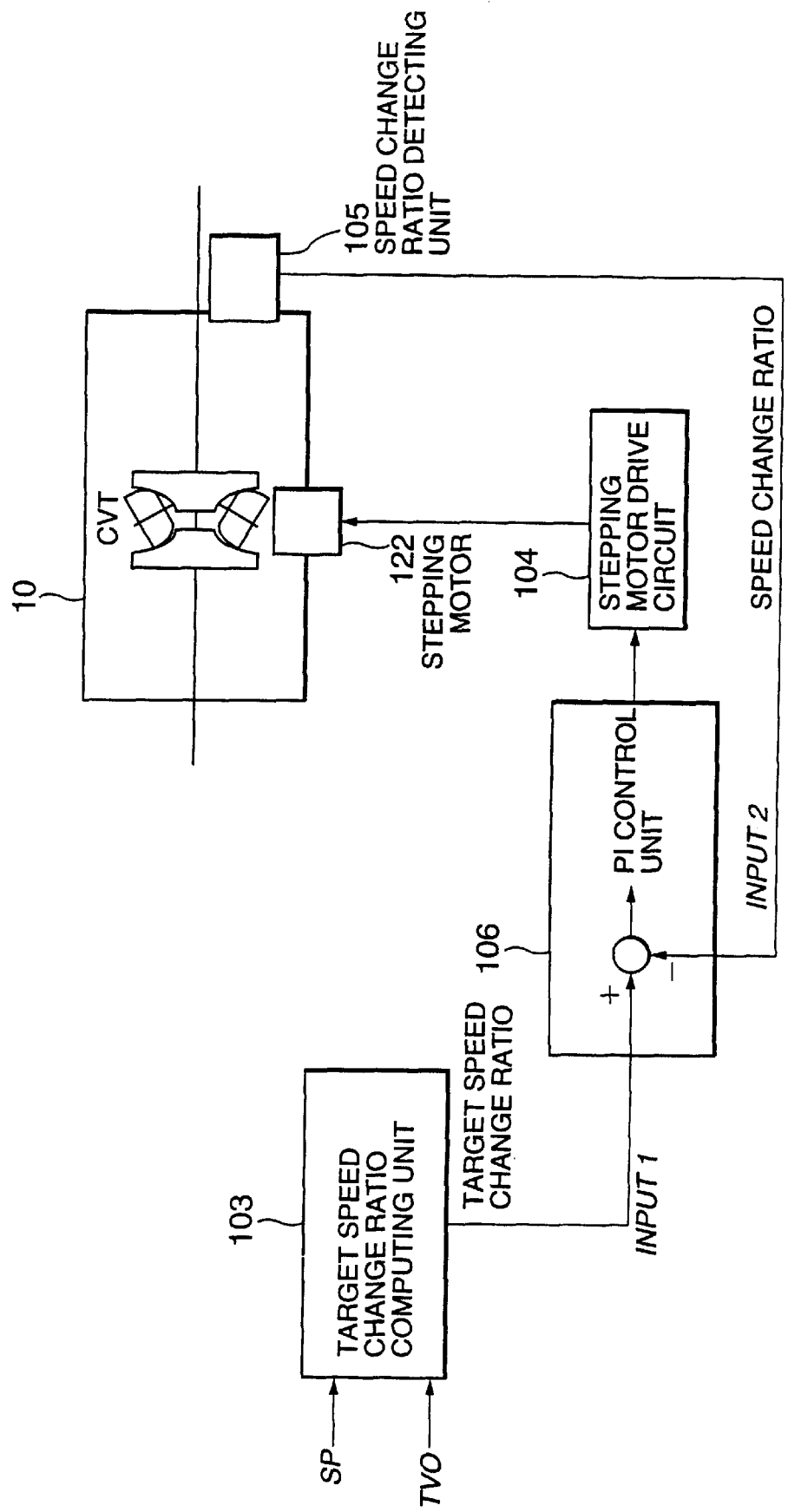
FIG. 3 is a block diagram of a speed change controller according to a first embodiment of this invention.

As shown in FIG. 3, this speed change controller comprises a target speed change ratio computing unit 103 which computes a target speed change ratio, a PI control unit 106, a stepping motor drive circuit 104 which drives the stepping motor 122, and a speed change ratio detecting unit 105 which detects a real speed change ratio of the continuously variable transmission 10. The speed change ratio detecting unit 105 may comprise for example a rotation sensor which detects the rotation speed of the input shaft 14 and a rotation sensor which detects the rotation speed of an output shaft, not shown, connected to the output gear 22.

The target speed change ratio computing unit 103 computes a target engine rotation speed suited to dynamic characteristics and fuel-cost performance from vehicle running conditions such as an engine throttle opening TVO and vehicle speed VSP. The target speed change ratio, I.e. a target gyration angle of the power roller 20, is computed from this target engine rotation speed, vehicle speed VSP and values depending on the vehicle such as final gear ratio and tire diameter, etc.

The PI controller 106 computes a proportional part obtained by multiplying a difference between the target speed change ratio and the speed change ratio of the continuously variable transmission 10 detected by the speed change ratio detecting unit 105, by a predetermined proportional gain. An integral part is also calculated by multiplying the difference between the target speed change ratio and speed change ratio of the continuously variable transmission 10, by a predetermined integral gain. The sum total of the proportional part and integral part is output to the stepping motor drive circuit 104. The stepping motor drive circuit 104 outputs a step number according to the output of the PI control unit 106 to the stepping motor 122.

Figure 4:
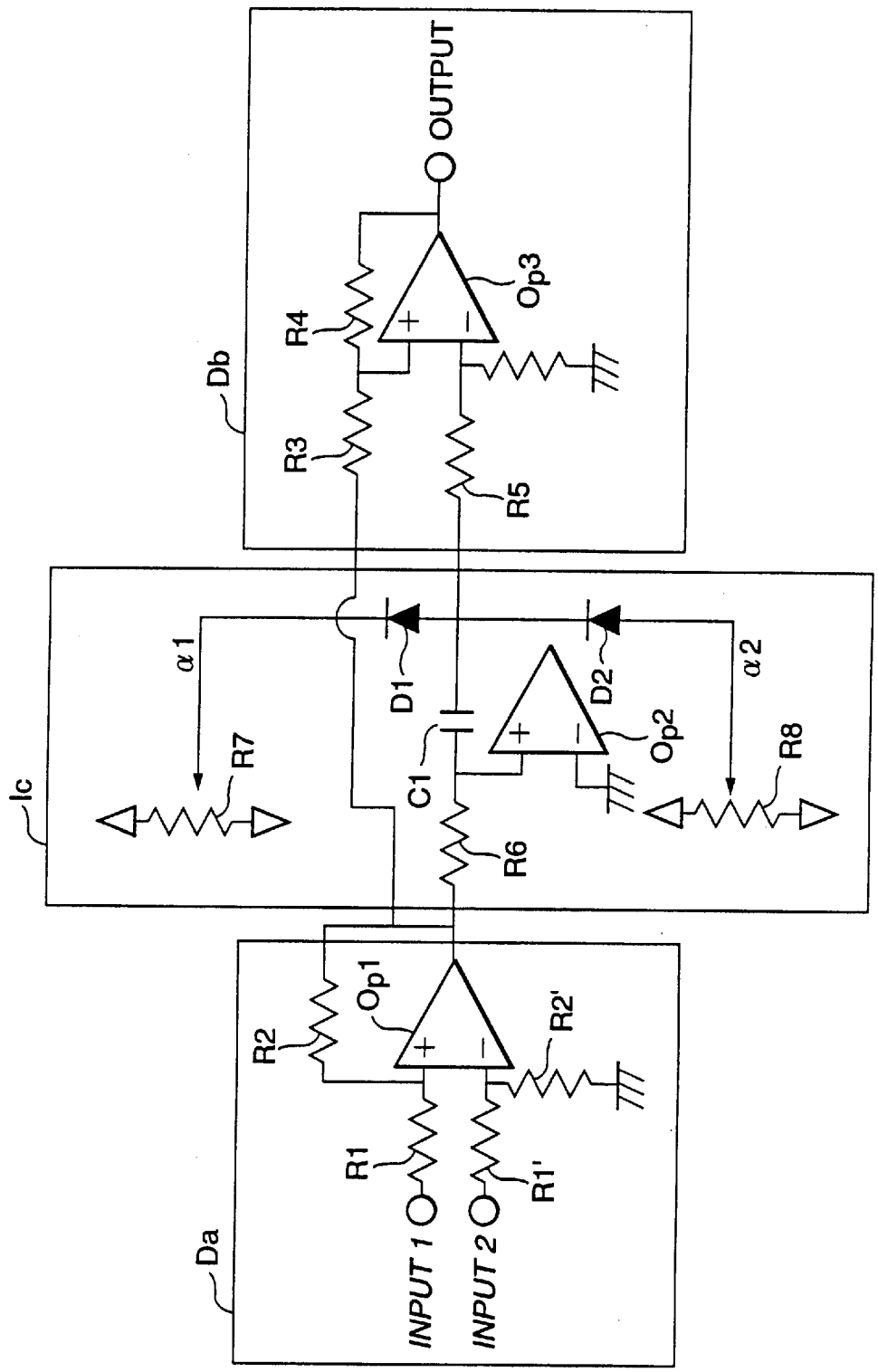
FIG. 4 is a circuit diagram of a PI control unit of the speed change controller.

The PI control unit 106 is constructed as shown in FIG. 4. In actual practice, PID (Proportional Integral Differential) control is performed, however as differential control is the same as that of the prior art, its description will be omitted here.

The PI control unit 106 comprises an integral circuit Ic which operates between an upper limiting value $\alpha_1$ and a lower limiting value $\alpha_2$. The upper limiting value $\alpha_1$ and a lower limiting value $\alpha_2$ are determined so as to satisfy external disturbance suppression requirements and ramp response requirements. Ramp response describes the ability of the real speed change ratio to respond to the target speed change ratio as it increases or decreases with increase or decrease of vehicle speed.

An operating amplifier Op1 forms a subtracting circuit Da with resistors R1, R1', R2, R2', and outputs a difference between an input 1 and input 2.

An operating amplifier Op2 forms an integrating circuit Ic with a resistor R6, variable resisters R7, R8, diodes D1, D2 and a condenser C1.

When an output of the operating amplifier Op2 is greater than the voltage $\alpha_1$ which is preset by the variable resistor R7, a current flows from the diode D1 to the variable resistor R7 so that the output of the integrating circuit Ic is not greater than the voltage $\alpha_1$.

In the same way, when the output of the operating amplifier Op2 is less than a voltage $\alpha_2$ preset by a resistor R8, a diode D2 causes current to flow from the variable resistor R8 to the integrating circuit Ic so that the output of the integrating circuit Ic is not less than the lower limit $\alpha_2$.

This upper limiting voltage a, and lower limiting voltage $a_2$ are determined so as to satisfy external disturbance suppression requirements and ramp response requirements.

On the output side of the integrating circuit Ic, a subtraction circuit Db formed by an operating amplifier Op3 and resistors R3, R4, R5 is provided. The subtraction circuit Db adds integral values between the upper and lower limits to the difference between the above input 1 and input 2, and outputs the result. The reason why Db is a subtraction circuit is because the output of the integrating circuit is a negative value.

The proportional gain and integral gain may be adjusted as desired by adjusting the resistors R3, R4, R5 of the subtraction circuit Db.

Due to the aforesaid construction, the integrating circuit Ic of the PI control unit 106 performs a restricted operation between upper and lower limiting values relative to its integral output.

Figure 5:
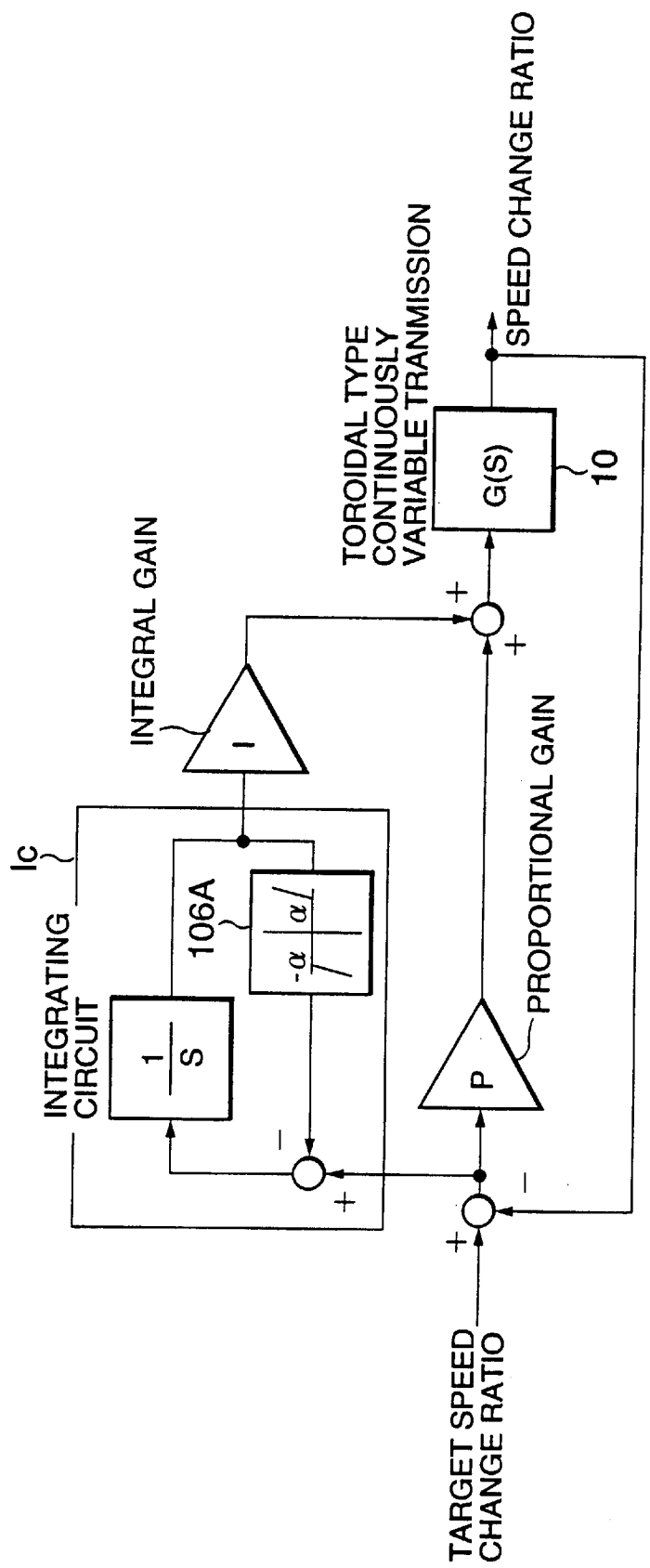
FIG. 5 is a control diagram describing the concept of control by the speed change controller.

FIG. 5 shows the control concept of the PI control unit 106. Herein, when the output of the integrating circuit Ic exceeds the predetermined upper limit $\alpha$, the output value of the integrating circuit Ic is restricted to the upper limit by applying $\alpha$ large negative input to the input of the integrating circuit Ic.

Similarly, when the lower limit $-\alpha$ is exceeded output value of the integrating circuit Ic is restricted to the lower limit by applying a large positive input to the input of the integrating circuit Ic. Herein, $\alpha$, in FIG. 4 corresponds to $\alpha$, and $\alpha_2$ corresponds to $-\alpha$.

By providing the integrated output with a limiting function, the performance of the integrating circuit Ic is partially suppressed, and this has a negative impact on the ramp response characteristics and external disturbance suppression characteristics of the integrating circuit Ic. However, the speed change target value supplied to the toroidal continuously variable transmission is predetermined by vehicle characteristics. Moreover, as external disturbances are due to deformation of the parts comprising the mechanical feedback mechanism of the toroidal continuously variable transmission, they can be predicted from experiment. The limiting value a may therefore be preset such that the ability to track the target speed change ratio, which is the ramp target value, and external disturbance suppression due to the mechanical feedback mechanism, are not adversely affected.

For example, to suppress external disturbance for a given target value, an integral control output equivalent to the applied disturbance is required. If the value for correcting the speed change ratio which varies due to an external disturbance acting on the toroidal continuously variable transmission is B and the integral gain l, it is required that $$\alpha \geq \frac{\beta}{I}.$$

Herein, as the correction amount B is related to external disturbance factors which are a property of the toroidal continuously variable transmission as described hereabove, its range may be specified by experiment. This range varies with the torque transmitted by the toroidal continuously variable transmission, and its upper limit $\beta_1$ and lower limit $\beta_2$ are set by performing experiments on various transmitted torques.

Also, to track the ramp target value, it is necessary that a $$\alpha \geq \frac{\gamma}{I},$$

where $\gamma$ is a value for correcting a difference between a target value when the ramp target value has a predetermined slope, and the real speed change ratio.

The slope of the ramp target value is determined by the characteristics of the vehicle as described above, and may be preset, so here too it is also possible to set an upper limit $\gamma_1$ and a lower limit $\gamma_2$. Therefore, to suppress external disturbance and track the ramp target value, the upper limit condition is $$\alpha_1 \geq \frac{\beta_1 + \gamma_1}{I}$$

and the lower limit condition is $$\alpha_2 \leq \frac{\beta_2 + \gamma_2}{I}$$

where $\beta_2$ and $\gamma_2$ are negative values. $\beta_1$ and $\gamma_1$ are not necessarily both applied at the same time, so considering actual running conditions, $\alpha_1$ maybe set even smaller. Similarly, $\alpha_2$ may be set even larger.

Hence if the integral circuit Ic is so designed that values above the upper limit $\alpha_1$ or values below the lower limit $\alpha_2$ are not output, even when the change in the difference between the target value and measured value exceeds the operating speed limit (response speed limit) of the stepping motor, the integral control output does not rise above the upper limit $\alpha_1$ or fall below the lower limit $\alpha_2$, and overshoot of the speed change ratio is suppressed to a minimum.

FIGS. 6A–6C and FIGS. 13A–13C show simulation results when the integrating circuit Ic is provided with a limit function 106A and when it is not provided with such a function. When the real speed change ratio exceeds the target speed change ratio due to an external disturbance or a change of the target speed change ratio, the real engine rotation speed drops below the target engine rotation speed as shown in FIG. 13A. As a result the proportional control output P is generated, and the integral control output I then varies, for example as shown by the region a in FIG. 13B. However when the required speed change ratio variation of the transmission exceeds the drive speed of the stepping motor 122, the target step number and real step number do not coincide. Consequently, the speed change ratio variation is not eliminated, the proportional control output P does not disappear, and the cumulative value of the integral control output I increases.

Subsequently, the real speed change ratio of the toroidal continuously variable transmission 10 coincides with the target speed change ratio, and the proportional control output P is no longer output. However the cumulative control output I unnecessarily accumulates as shown by the region B in FIG. 13B, and the speed change ratio overshoots as shown by the region c in FIG. 13A.

Figure 6A:
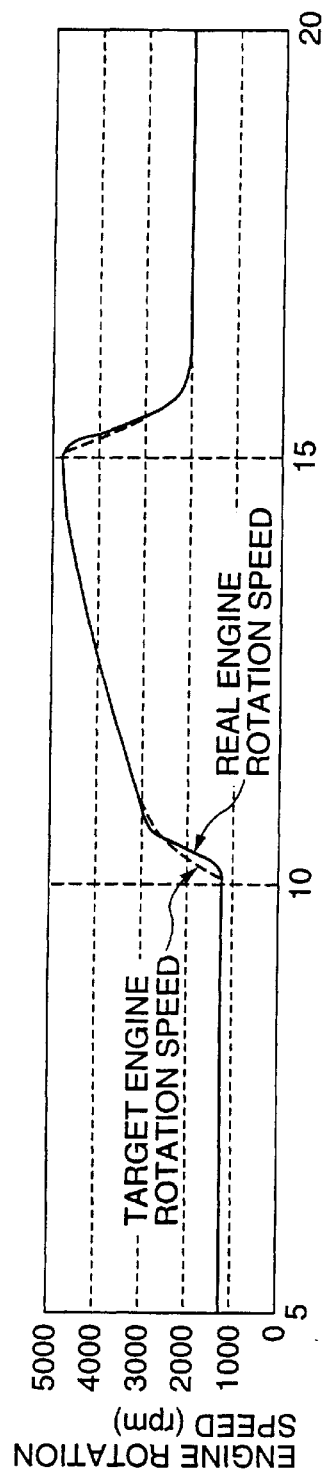
FIGS. 6A–6C are timing charts showing variations of engine rotation speed, control output and a step number of a step motor under control by the speed change controller.
Figure 6B:
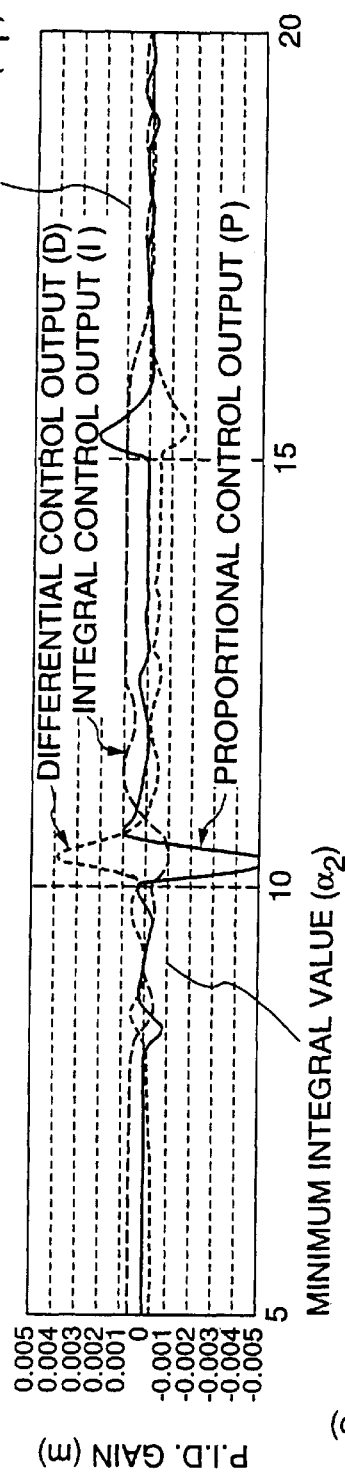
Figure 6C:
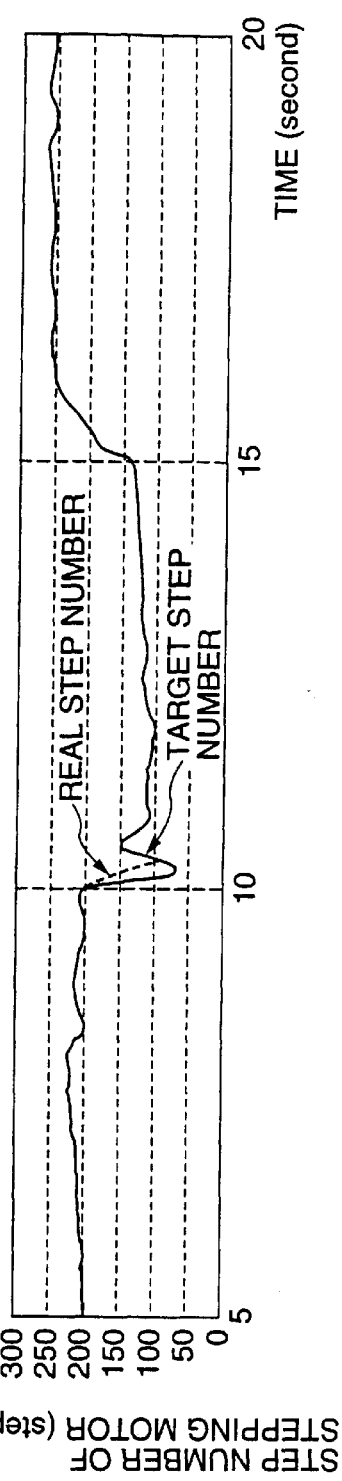

On the other hand, in the controller according to this invention, even when a required value exceeding the drive speed limit of the step motor 122 is generated, the integral control output does not rise above $\alpha_1$, or fall below $\alpha_2$, and unnecessary increase of the integral is suppressed. As a result, overshoot of the real speed change ratio can be reduced, as shown the variation of real engine rotation speed in FIG. 6A FIG. 7 shows a second embodiment of this invention.

Figure 7:
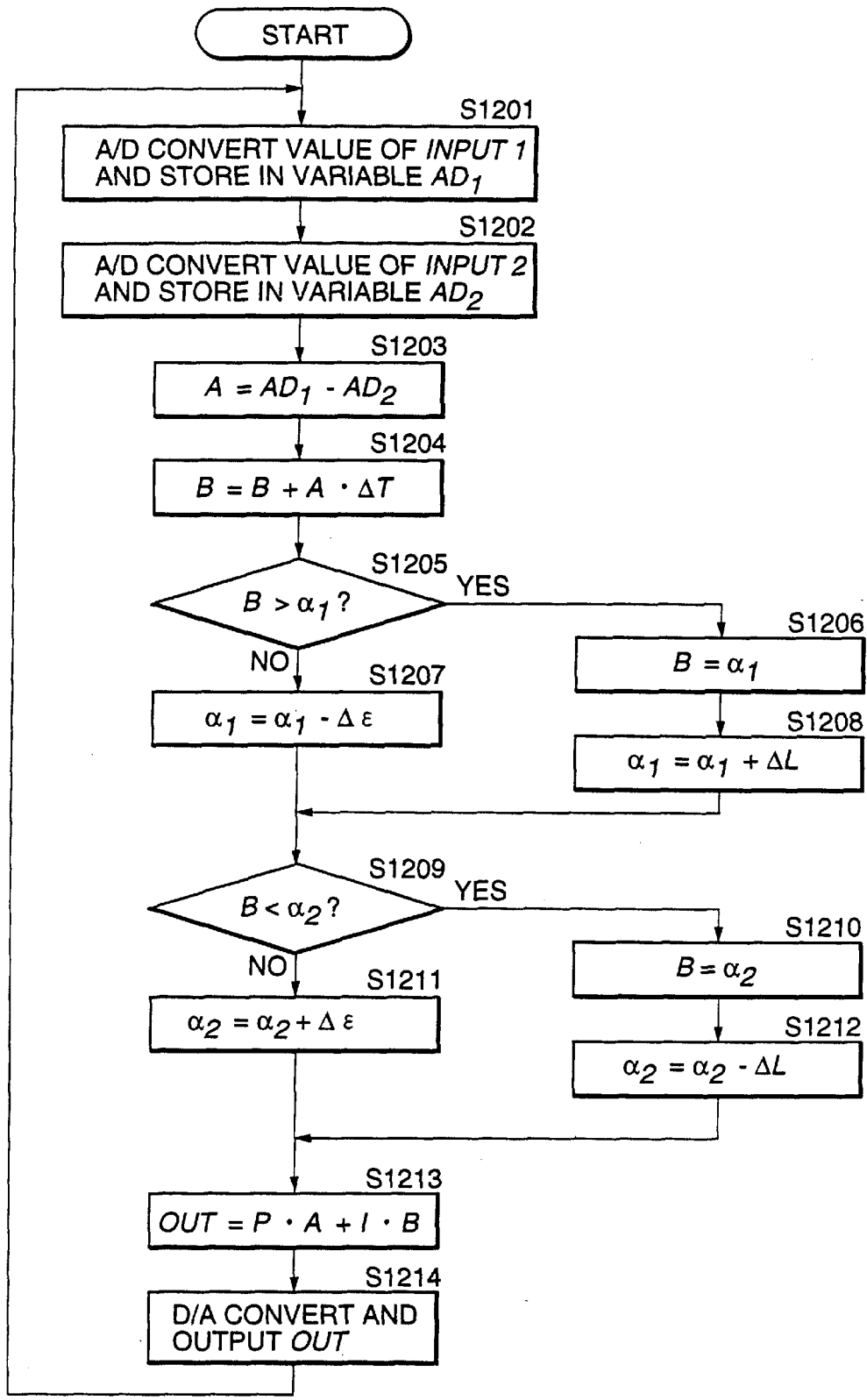
FIG. 7 is a flowchart describing a process for calculating an output value OUT which is output to the stepping motor according to a second embodiment of this invention.

According to this embodiment, the PI control unit 106 of the first embodiment comprises a microcomputer provided with an A/D converter and a D/A converter, and control is performed according to the flowchart shown in FIG. 7. Herein, the target speed change ratio Is Input as the input 1, and the real speed change ratio of the continuously variable transmission 10 detected by the speed change ratio detecting unit 105 is input as the input 2.

First, in a step S1201, the input 1 is A/D converted and stored as a parameter $AD_1$. In a step S1202, the input 2 is A/D converted and stored as a parameter $AD_2$. In a step S1203, the difference between the aforesaid $AD_1$ and $AD_2$ is stored as a parameter A.

In a step S1204, integration is performed by adding to a parameter B, a value obtained by multiplying a time $\Delta T$ required to perform the processing from the step 1201 to the step S1214 by the parameter A, and the result is stored as the parameter B.

In a step S1205, the value of the parameter B which is an integral value is compared with the preset upper limit $\alpha_1$.

When the parameter B exceeds $\alpha_1$, the routine proceeds to a step S1206, and the value of the parameter B is set equal to the parameter $\alpha_1$. In a step S1208, $\Delta L$ which is a predetermined incremental amount is added to $\alpha_1$, and the result is stored as $\alpha_1$.

When the parameter B is equal to or less than $\alpha_1$ in the step S1205, the routine proceeds to a step S1207, and $\Delta \epsilon$ which is a predetermined decremental amount is subtracted from $\alpha_1$.

In this way, the upper limit $\alpha_1$ is increased by $\Delta L$ each time the parameter B exceeds $\alpha_1$, and the upper limit $\alpha_1$ is decreased by $\Delta \epsilon$ each time the parameter B is equal to or less than $\alpha_1$.

In general, the frequency with which the parameter B exceeds the upper limit $\alpha_1$ is less than the frequency with which the parameter B is equal to or less than $\alpha_1$, therefore $\Delta \epsilon$ is set to a smaller value than $\Delta L$ so that the average of $\alpha_1$ approaches its initial set value.

From the step S1209 to the step S1212, processing is performed based on a comparison between the preset lower limit $\alpha_2$ and the parameter B, similarly to the processing performed from the step S1205 to the step S1208.

Due to the above processing, when the frequency with which the parameter B exceeds the upper limit $\alpha_1$ or falls below the lower limit $\alpha_2$ is low, the limiting range of the parameter B specified by $\alpha_1$ and $\alpha_2$ is narrowed, and conversely, when this frequency is high, the limiting range is widened.

In a step S1213, the parameter A is multiplied by a predetermined proportional gain P, the parameter B found in the step S1204 is multiplied by a predetermined integral gain I, and the sum total is stored in a parameter OUT, In a step S1214, the value stored in the parameter OUT is D/A converted and output to the step motor 122.

The aforesaid processing is repeated at a predetermined time interval.

Due to the above processing, similarly to the case of the first embodiment, when the output of the integrating circuit Ic exceeds the upper limit $\alpha_1$ or falls below the lower limit $\alpha_2$ due to operating speed limitations of the step motor 122, this output is corrected to the upper limit or the lower limit. Therefore overshoot of the speed change ratio due to unnecessary integration of the integrating circuit Ic is suppressed, and there is also the following effect.

When the parameter B which is an integral value frequently exceeds the upper limit $\alpha_1$ or falls below the lower limit $\alpha_2$, the upper limit $\alpha_1$ or lower limit $\alpha_2$ varies according to this frequency. Hence, even when the characteristics of the toroidal continuously variable transmission 10 vary due to deterioration with time, the disadvantage of inappropriately limiting the integral control output is avoided.

Figure 8A:
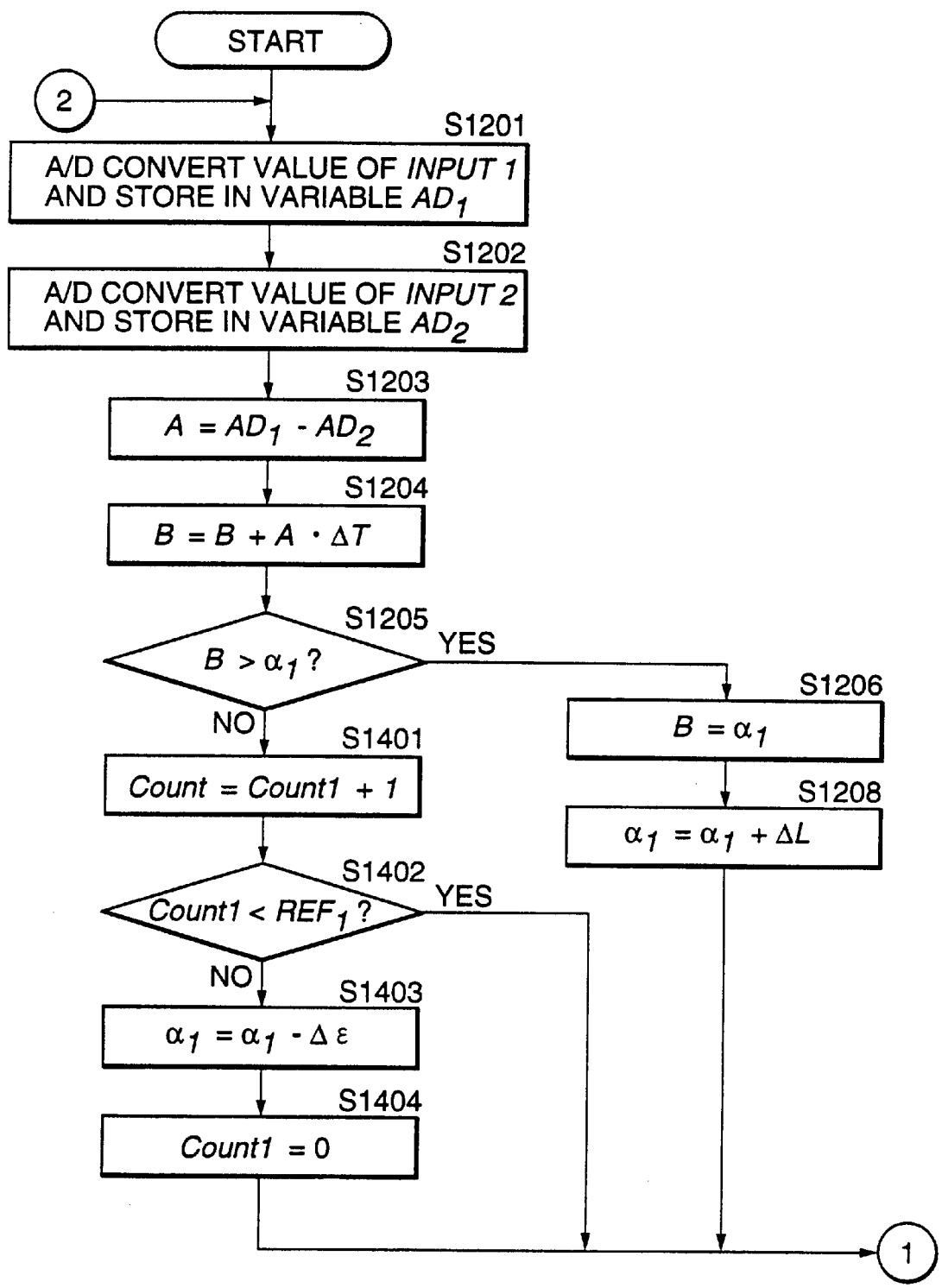
FIGS. 8A, 8B are flowcharts describing a process for calculating an output value OUT which is output to the step motor according to a third embodiment of this invention.
Figure 8B:
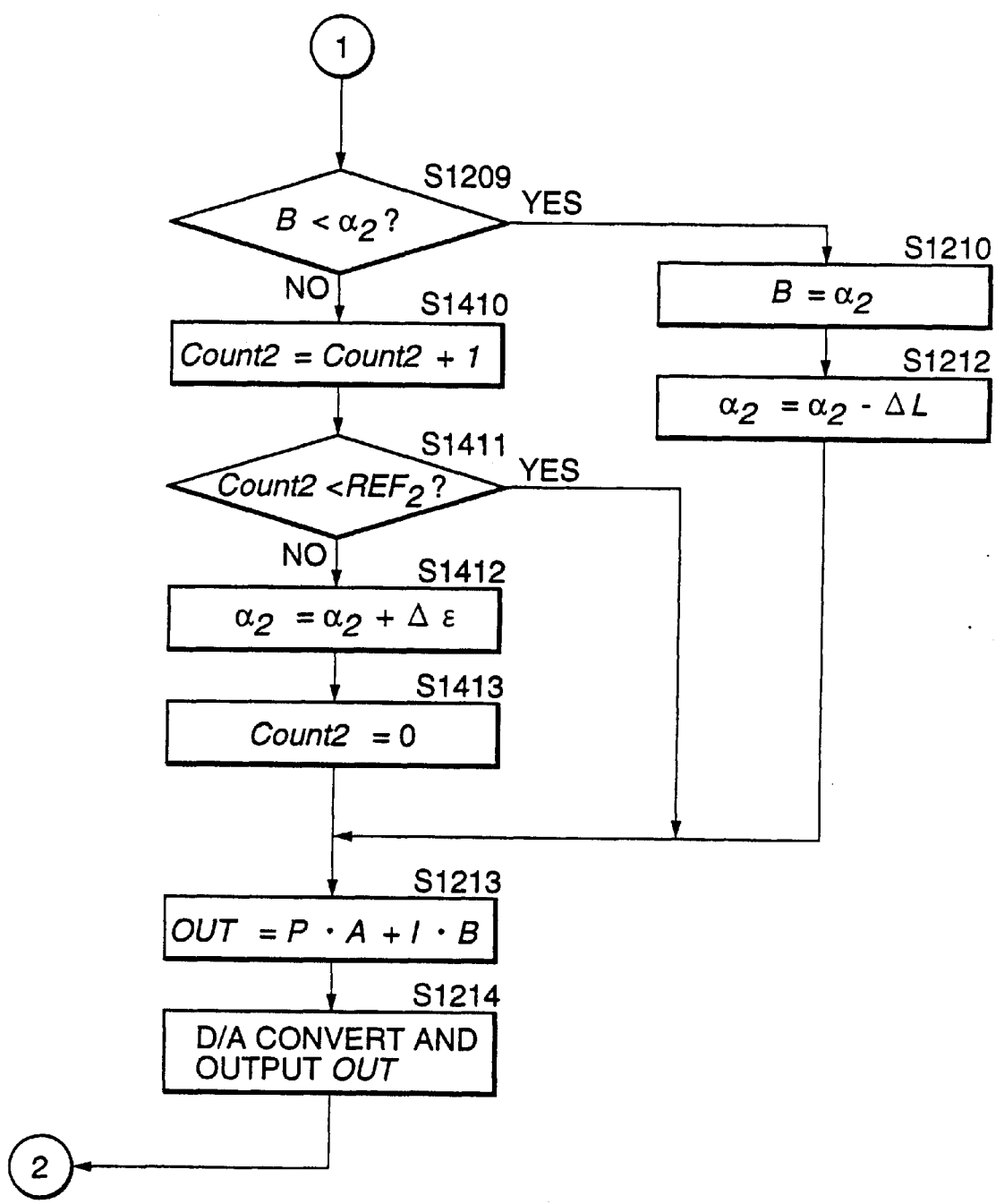

FIGS. 8A and 8B show a third embodiment of this invention.

According to this embodiment, the step S1207 of the second embodiment is replaced by steps S1401–S1404, and the step S1211 is replaced by the steps S1410–S1413. The remaining processing is the same as that of the aforesaid second embodiment.

According to this embodiment, when it is determined that the parameter B in the step S1205 is less than the upper limit $\alpha_1$, 1 is added to a parameter Count1 in the step S1410. In the step S1402, when it is determined that the parameter Count1 has exceeded a predetermined value $REF_1$, $\Delta\epsilon$ is subtracted from the upper limit $\alpha_1$ in the step S1403, and Count1 is reset to 0 in the step S1404.

The value of $\Delta\epsilon$ can therefore be set larger than in the second embodiment, the number of effective digits in the computation may be reduced and the computation can be simplified.

In the processing of the steps S1410–S1413, based on the same concept as that of the steps S1401–S1404, $\Delta\epsilon$ is added to the lower limit $\alpha_2$ when a parameter $Count_2$ becomes equal to or greater than a predetermined value $REF_2$.

Figure 9:
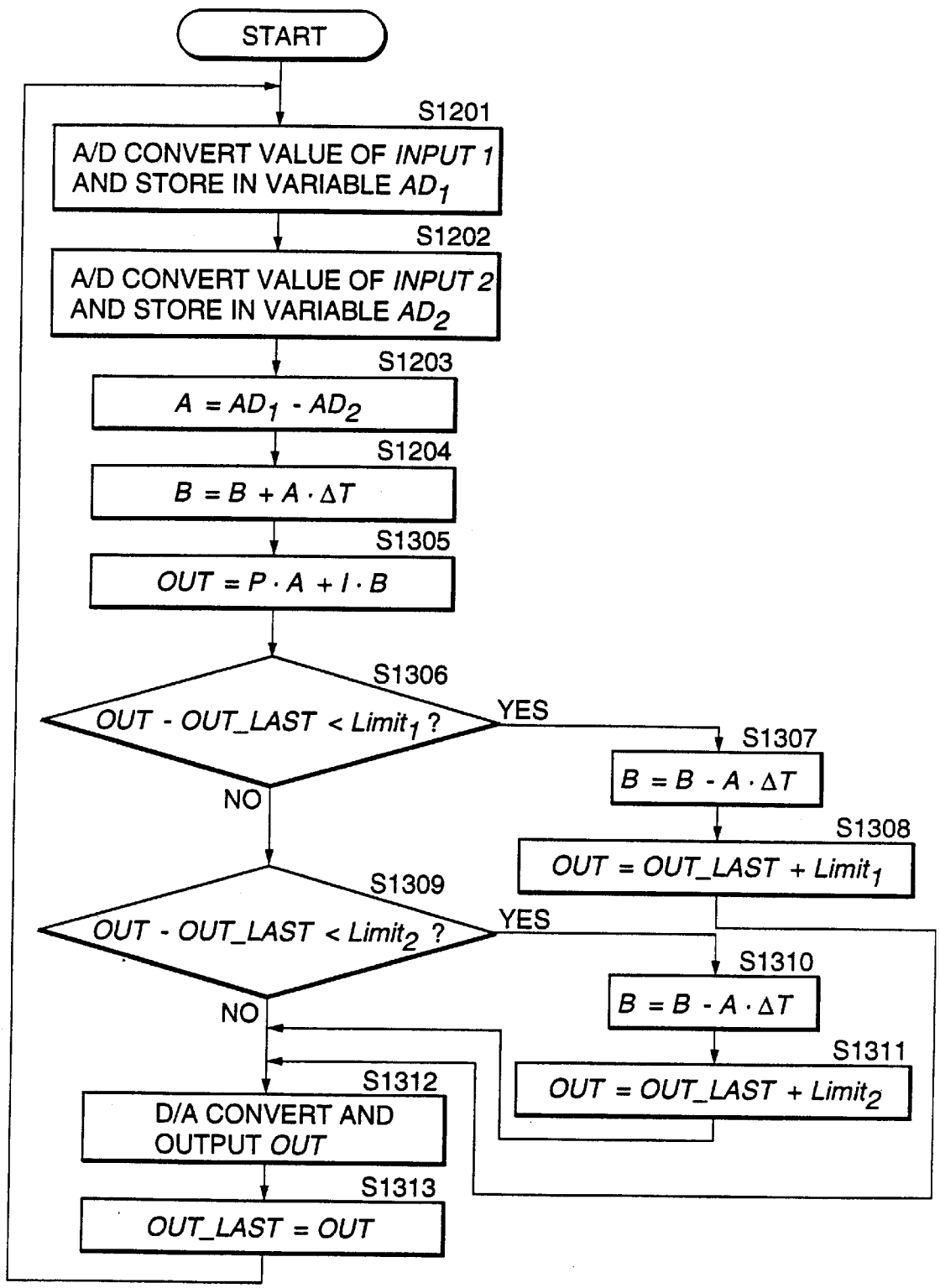
FIG. 9 is a flowchart describing a process for calculating an output value OUT which is output to the step motor according to a fourth embodiment of this invention.

FIG. 9 shows a fourth embodiment of this invention.

According to this embodiment, as in the case of the second and third embodiments, the PI control unit 106 comprises a microcomputer, and a parameter OUT is determined according to the flowchart of FIG. 9.

According to this embodiment, in steps S1201–S1204, immediately after calculating the parameters A and B, the parameter OUT is calculated in a step S1305.

In a step S1306, it is determined whether or not a difference between the immediately preceding value OUT_LSAT of the parameter OUT and the present value of OUT is larger than a predetermined limiting value $Limit_1$.

When this difference is larger than $Limit_1$, the routine proceeds to a step S1307, and the product of the parameters A and $\Delta T$ is subtracted from the parameter B found in the step S1204 so as to restore the value of the parameter B to what it was before performing the processing of the step S1204. In a step S1308, a value found by adding $Limit_1$ to the immediately preceding value OUT_LAST is stored in the parameter OUT, the value of the parameter OUT is D/A converted in a step S1312, and the result is output to the step motor 122.

The limiting value $Limit_1$ is set so that a rotation speed beyond the performance of the stepping motor 122 is not required. As the control process of FIG. 9 is executed at a fixed time interval, the rotation speed of the stepping motor 122 depends on the step number supplied to the stepping motor 122, I.e. the value of the parameter OUT, and the rotation speed of the stepping motor 122 increases the larger this value is. The limiting value $Limit_1$ is therefore determined so that the parameter OUT is within the rotation speed limit of the stepping motor 122. It should however be noted that this limit is different according to the drive direction of the spool 126, I.e. the rotation direction of the stepping motor 122.

On the other hand, when the difference between the immediately preceding value OUT_LSAT of the parameter OUT and the present value of OUT is less than $Limit_1$ in the step S1306, the routine proceeds to a step S1309.

Herein, it is determined whether or not the difference between the value of the parameter OUT and the immediately preceding value OUT_LAST is less than a negative limiting value $Limit_2$ (near 0). This limiting value $Limit_2$ also represents the rotation speed limit of the stepping motor 122, and it is the limiting value for the case when the stepping motor 122 is rotated in the opposite direction.

When this difference is larger than the negative limiting value $Limit_2$, I.e., the absolute value of the former is larger than that of the latter, in a step S1310, the value of the parameter B is restored to what it was before the processing of the step S1204, as in the case of the processing of the step S1307.

In a step S1311, a value obtained by adding $Limit_2$ to the immediately preceding value OUT_LAST, is stored in the parameter OUT, the value of the parameter OUT is D/A converted in a step S1312, and the result is output to the step motor 122.

By the above processing, integration processing is stopped whenever there is an output request beyond the operating speed limit of the stepping motor 122, so overshoot of the speed change ratio due to unnecessary integration by the integrating circuit which occurred in the prior art, is suppressed.

According to this embodiment, regarding upper and lower limits, the limiting values $Limit_1$ and $Limit_2$ are set from the rotation speed limits of the stepping motor 122, and upper limits are not set on the integral control output. Setting of basic data required for control is therefore easy.

Figure 10:
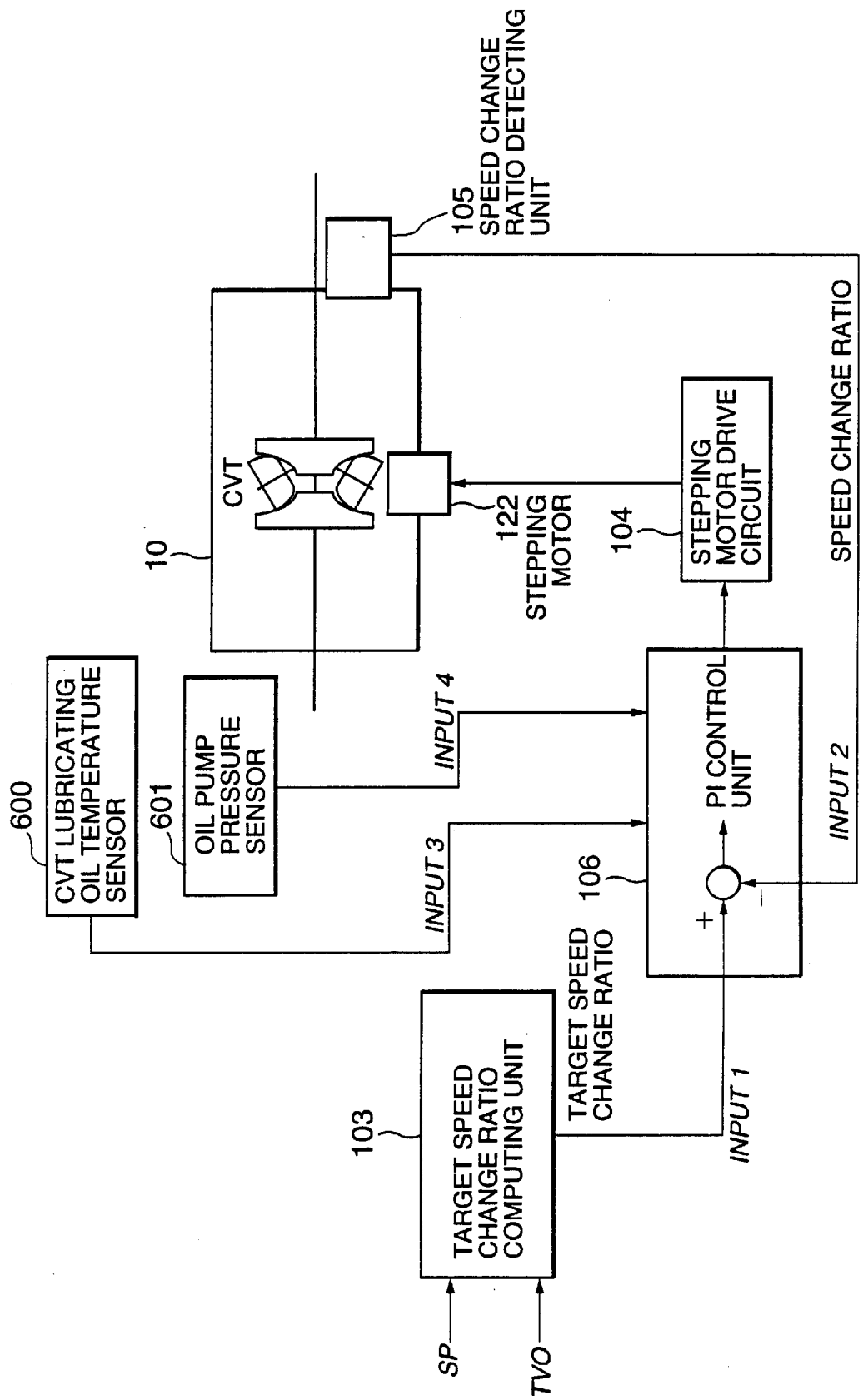
FIG. 10 is similar to FIG. 1, but showing a fifth embodiment of this invention.
Figure 11:
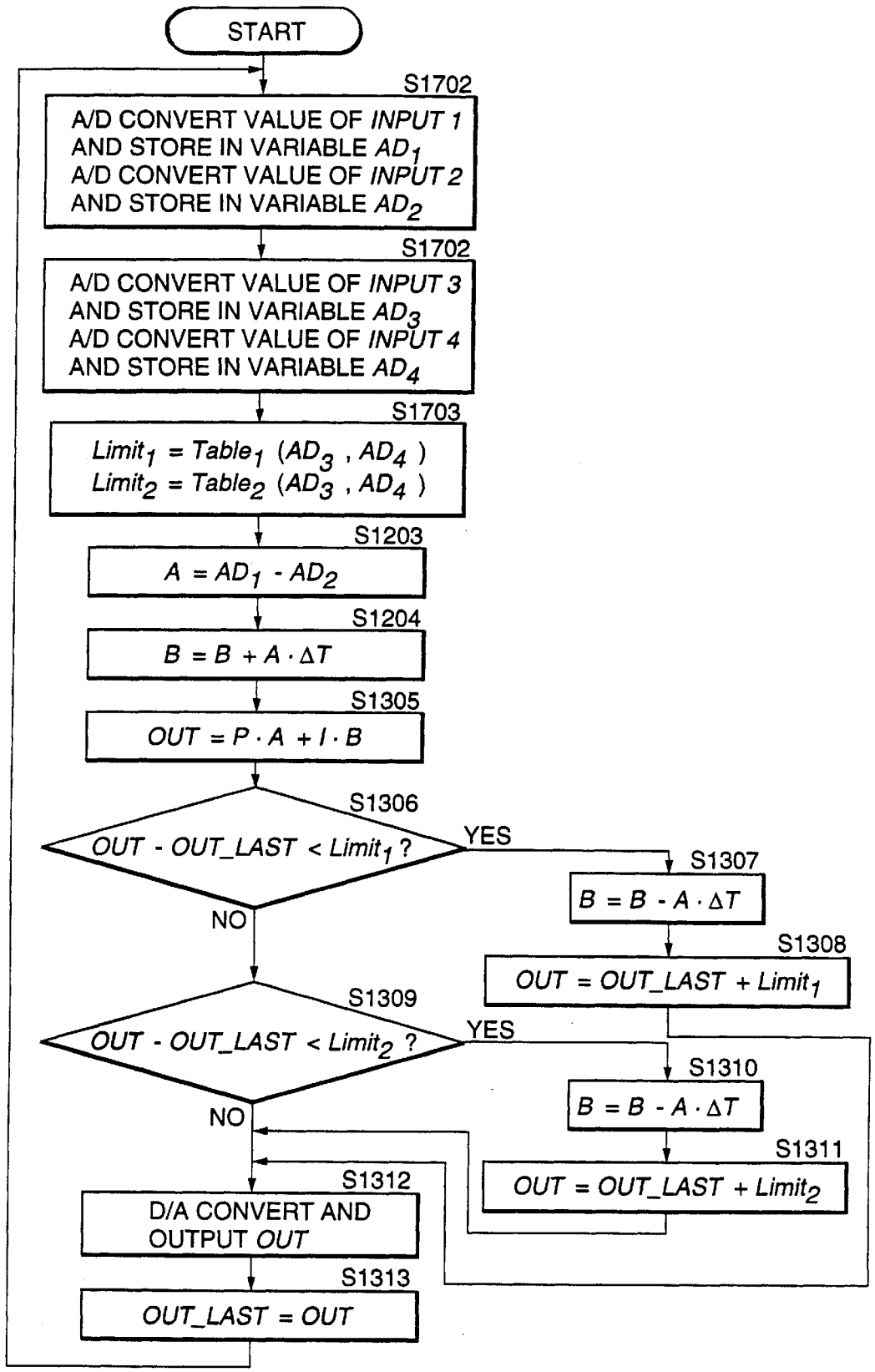
FIG. 11 is a flowchart describing a process for calculating an output value OUT which is output to the step motor according to the fifth embodiment of this invention.
Figure 12:
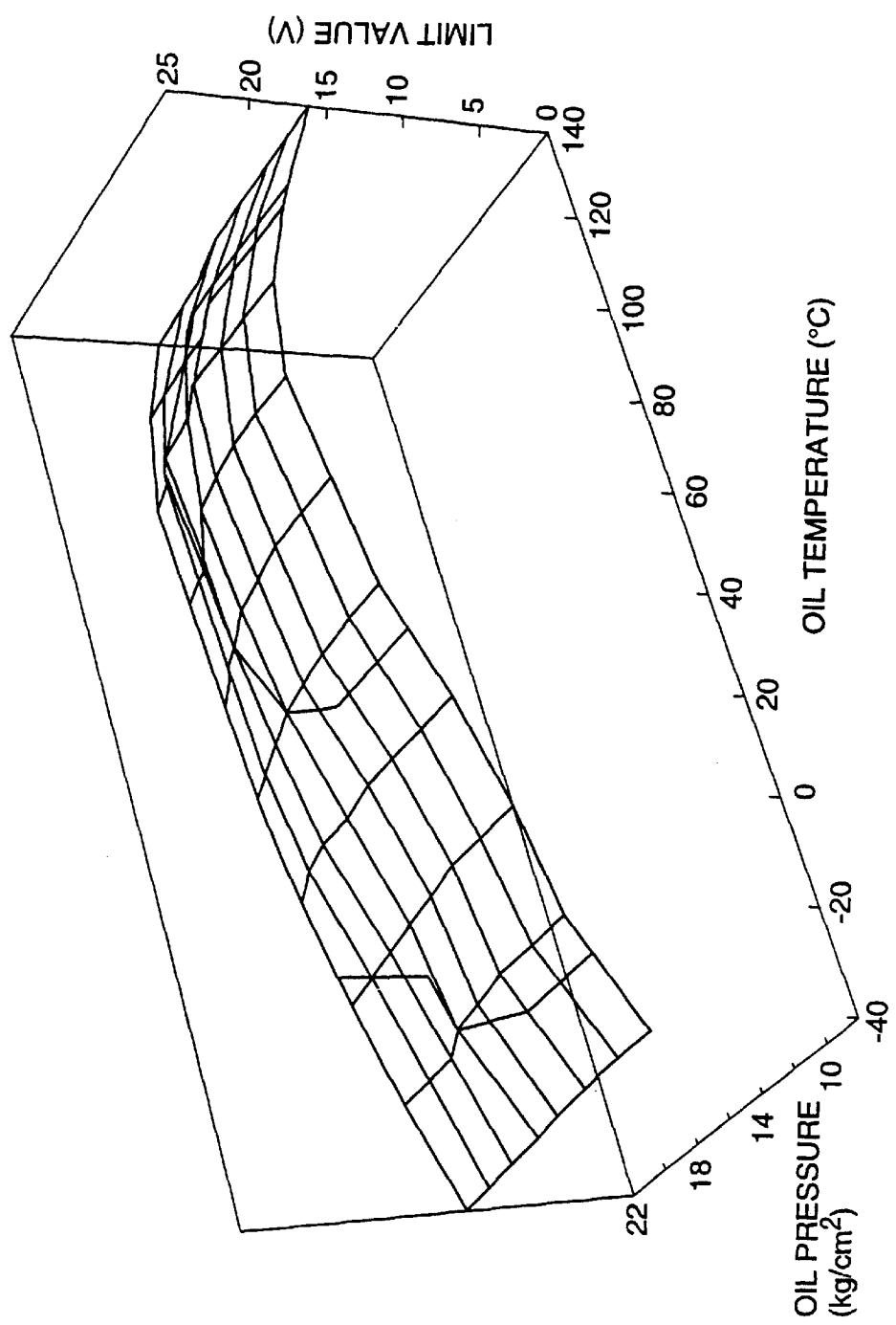
FIG. 12 is a map for setting a limiting value Limit according to the fifth embodiment of this invention.

FIGS. 10–12 show a fifth embodiment of this invention.

According to this embodiment, as shown in FIG. 10, signals from a CVT lubricating oil temperature sensor 600 which detects the temperature of lubricating oil used for performing lubrication between the power roller 20, input cone disc 16 and output cone disc 18, and from an oil pump pressure sensor 601 which detects a discharge pressure of an oil pump which is a supply source of this lubricating oil and also the hydraulic pressure supplied to the oil chambers 108C, 108D, are input as inputs 3, 4 to the PI control unit 106 comprising a microcomputer. The PI control unit 106 controls the stepping motor 122 according to a flowchart shown in FIG. 11.

This flowchart has $Limit_1$ and $Limit_2$ of the aforesaid fourth embodiment as parameters, and it determines $Limit_1$, $Limit_2$ by looking up a preset table from the lubricating oil temperature and oil pump discharge pressure.

First, in a step S1701, the target speed change ratio input as input 1 is stored in a parameter $AD_1$, and the real speed change ratio input as input 2 is stored in a parameter $AD_2$. In a step S1702, the CVT lubricating oil temperature input as input 3 is stored in a parameter $AD_3$, and the oil pump discharge pressure input as input 4 is stored as a parameter $AD_4$.

In a step S1703, the limiting values $Limit_1$, $Limit_2$ are computed from the parameters $AD_3$, $AD_4$ using a $Table_1$ and $Table_2$ having the characteristics shown in FIG. 12.

The tables Table$_1$ and Table$_2$ are preset from experiment.

Limit$_1$=Table$_1$ (AD$_3$, AD$_4$)

Limit$_2$=Table$_2$ (AD$_3$, AD$_4$)

In FIG. 12, the limiting values Limit$_1$, Limit$_2$ are reduced according to the oil temperature rise when the lubricating oil temperature rises to 100° C. and above. This is based on the Inventors' experimental result that when the lubricating oil rises to such a high temperature, the maximum torque that can be transmitted between the input cone disc 16 and output cone disc 18 via the power roller 20 falls, and it is inappropriate to vary the speed change ratio at high speed.

The step S1203 and subsequent steps are the same as those of the aforesaid fourth embodiment.

According to this fifth embodiment, the limiting values Limit$_1$, Limit$_2$ which correspond to the rotation speed limits of the stepping motor 122 vary according to the temperature of the lubricating oil and pressure supplied to the continuously variable transmission, and optimum limiting values Limit$_1$, Limit 2 may be set for a wider range of running conditions. Consequently, impairment of speed change control due to over-rigorous limit settings is avoided.

The CVT lubricating oil temperature sensor 600 may be replaced by a different sensor having a relation to the temperature of the lubricating oil supplied to the continuously variable transmission 10, e.g. an engine water temperature sensor.

All the above embodiments describe the application of this invention to a speed change controller for the toroidal type continuously variable transmission 10, but this invention may be applied also to a speed change controller of a V-belt type continuously variable transmission.

The corresponding structures, materials, acts, and equivalents of all means or step plus function elements in the claims below are intended to include any structure, material, or acts for performing the functions in combination with other claimed elements as specifically claimed.

The embodiments of this invention in which an exclusive property or privilege is claimed are defined as follows:

What is claimed is:

1. A speed change controller for use with a continuously variable transmission of a vehicle, said transmission having an actuator for continuously varying a speed change ratio of said transmission, comprising:
a sensor for detecting a real speed change ratio of the transmission, and a control circuit configured to:
set a target speed change ratio of the transmission according to a running state of the vehicle,
calculate a proportional value which is directly proportional to a difference between the target speed change ratio and the real speed change ratio,
calculate an integral value which is the integral of the difference between the target speed change ratio and the real speed change ratio,
correct the integral value to a predetermined positive value when the integral value is larger than the predetermined positive value, and
drive the actuator based on the sum total of the proportional value and the integral value.

2. A speed change controller as defined in claim 1, wherein the control circuit is further configured to correct the integral value to a predetermined negative value when the integral value is smaller than the predetermined negative value.

3. A speed change controller as defined in claim 2, further comprising a device for detecting a running state of the transmission, wherein the control circuit is further configured to set the predetermined positive value and the predetermined negative value according to the running state of the transmission.

4. A speed change controller as defined in claim 2, wherein the control circuit is further configured to set the absolute value of the predetermined negative value equal to the predetermined positive value.

5. A speed change controller as defined in claim 2, wherein the control circuit is further configured to increase the predetermined positive value by a first minute amount when the integral value is larger than the predetermined positive value, and to increase the absolute value of the predetermined negative value by the first minute amount when the integral value is smaller than the predetermined negative value.

6. A speed change controller as defined in claim 5, wherein the control circuit is further configured to decrease the predetermined positive value by a second minute amount less than the first minute amount when the integral value is not larger than the predetermined positive value, and to decrease the absolute value of the predetermined negative value by the second minute amount when integral value is not smaller than the predetermined negative value.

7. A speed change controller for use with a continuously variable transmission of a vehicle, said transmission having an actuator for continuously varying a speed change ratio of said transmission, comprising:
a sensor for detecting a real speed change ratio of the transmission,
a device for detecting a running state of the transmission, and
a control circuit configured to:
set a target speed change ratio of the transmission according to a running state of the vehicle,
calculate a proportional value which is directly proportional to a difference between the target speed change ratio and the real speed change ratio,
calculate an integral value which is the integral of the difference between the target speed change ratio and the real speed change ratio,
correct the integral value to a value within a preset range when the integral value does not lie within the preset range, the preset range being set to the running state of the transmission, and
drive the actuator based on the sum total of the proportional value and the integral value,
wherein the detecting device comprises a sensor for detecting a temperature of lubricating oil of the transmission and sensor for detecting a pressure thereof.

8. A speed change controller for use with a continuously variable transmission of a vehicle, said transmission having an actuator for continuously varying a speed change ratio of said transmission, comprising:
a sensor for detecting a real speed change ratio of the transmission, and
control circuit configured to:
set a target speed change ratio of the transmission according to a running state of the vehicle,
calculate a proportional value which is directly proportional to a difference between the target speed change ratio and the real speed change ratio,
calculate an integral value which is the integral of the difference between the target speed change ratio and the real speed change ratio,
calculate a command value to be output to the actuator based on the proportional value and the integral value, calculate a variation rate of the command value, stop calculating the integral value when the variation rate exceeds a predetermined variation rate, and drive the actuator by outputting the command value thereto.

9. A speed change controller as defined in claim 8, wherein the predetermined variation rate is set based on an operating speed limit of the actuator.

10. A speed change controller as defined in claim 8, further comprising a device for detecting a running state of the transmission, wherein the control circuit is further configured to determine the predetermined variation rate according to the running state of the transmission.

11. A speed change controller for use with a continuously variable transmission of a vehicle, said transmission having an actuator for continuously varying a speed change ratio of said transmission, comprising:

a sensor for detecting a real speed change ratio of the transmission, a device for detecting a running state of the transmission, and a control circuit configured to:

set a target speed change ratio of the transmission according to a running state of the vehicle, calculate a proportional value which is directly proportional to a difference between the target speed change ratio and the real speed change ratio, calculate an integral value which is the integral of the difference between the target speed change ratio and the real speed change ratio, calculate a command value to be output to the actuator based on the proportional value and the integral value, calculate a variation rate of the command value, stop calculating the integral value when the variation rate exceeds a predetermined variation rate, the predetermined variation rate being determined according to the running state of the transmission, and drive the actuator by outputting the command value thereto, wherein the detecting device comprises a sensor for detecting a temperature of lubricating oil of the transmission and a sensor for detecting a pressure thereof.

12. A speed change controller for use with a continuously variable transmission of a vehicle, said transmission having an actuator for continuously varying a speed change ratio of said transmission, comprising:

means for detecting a real speed change ratio of the transmission, means for setting a target speed change ratio of the transmission according to a running state of the vehicle, means for calculating a proportional value which is directly proportional to a difference between the target speed change ratio and the real speed change ratio, means for calculating an integral value which is the integral of the difference between the target speed change ratio and the real speed change ratio, means for correcting the integral value to a predetermined positive value when the integral value is larger than the predetermined positive value, and means for driving the actuator based on the sum total of the proportional value and the integral value.

* * * * *